Figure 1:
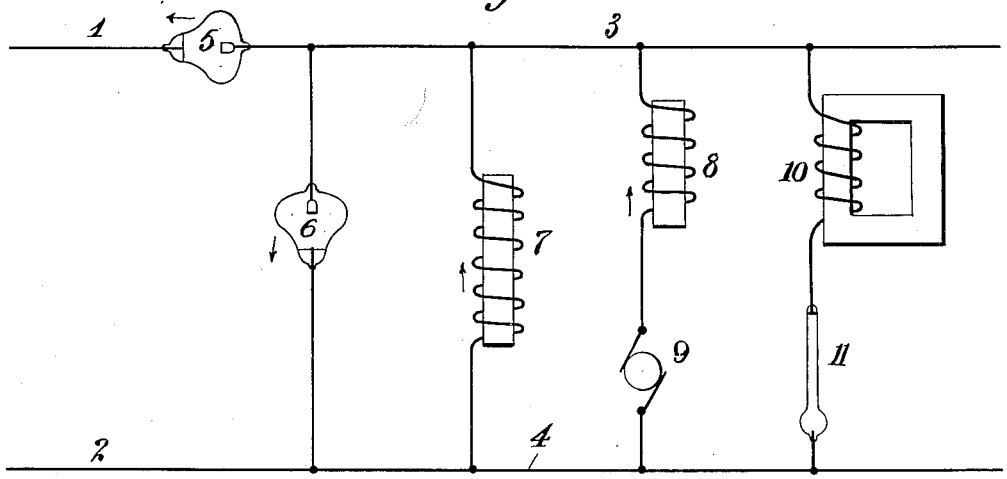

P. H. THOMAS.
ELECTRICAL DISTRIBUTION SYSTEM.
APPLICATION FILED MAR. 5, 1903.

1,115,455.

Patented Oct. 27, 1914.

P. H. THOMAS.
ELECTRICAL DISTRIBUTION SYSTEM.
APPLICATION FILED MAR. 5, 1903.

1,115,455.

Patented Oct. 27, 1914.
2 SHEETS—SHEET 2.

Witnesses:
Wm H Capel
G E Chapin

Inventor
Percy H. Thomas.
By his Attorney
Charles A. Terry

UNITED STATES PATENT OFFICE.

PERCY H. THOMAS, OF PITTSBURGH, PENNSYLVANIA, ASSIGNOR, BY MESNE ASSIGNMENTS, TO COOPER HEWITT ELECTRIC COMPANY, OF HOBOKEN, NEW JERSEY, A CORPORATION OF NEW JERSEY.

ELECTRICAL DISTRIBUTION SYSTEM.

1,115,455. Specification of Letters Patent. Patented Oct. 27, 1914.

Application filed March 5, 1903. Serial No. 146,282.

*To all whom it may concern:*

Be it known that I, PERCY H. THOMAS, a citizen of the United States, and resident of Pittsburgh, county of Allegheny, State of Pennsylvania, have invented certain new and useful Improvements in Electrical Distribution Systems, of which the following is a specification.

The present invention makes use of the qualities of the vapor converter combined with one or more magnets for regulating the current in a portion of a system supplied from a source of alternating or pulsating currents. The manner in which this object is accomplished will be understood by reference to the accompanying drawings, in which—

Figures 1, 2, 3 and 4, are diagrams of different organizations of electric circuits to which my invention may be applied.

In the drawings, 1 and 2 represent the mains of an alternating current supply system connected with a source of single phase alternating current.

The invention readily admits of being applied to alternating current supply systems of any number of phases, but for simplicity I have illustrated it in connection with a single phase system of supply.

The main conductors of the receiving circuit are shown at 3 and 4, and between the supply mains and the receiving mains I interpose a vapor converter, 5, which permits current to flow in the direction indicated by the arrow and practically prevents the flow of current in the opposite direction. In a shunt across the supply mains, I place a similar converter, 6. The direction of flow is indicated by the arrow in this instance also.

Between the receiving mains, I have illustrated several shunt circuits one of which includes a magnet, 7, another includes a magnet, 8, and a motor 9, while a third includes a magnet, 10, and a Cooper Hewitt lamp 11. It will be understood that other translating devices besides the motor 9 or the lamp 11, may be included in these shunts, and that still other shunt circuits may be added to those appearing in the illustration. In connection with the receiving circuit, however, one or more electromagnets should be employed, for reasons which will presently appear. For example, it is known that when the circuit of an electro-magnet is interrupted, the energy stored in the coils of the magnet tends to discharge itself in the same direction as that of the original flow. Thus, under the conditions illustrated in Fig. 1, the various translating devices in the receiving circuit are assumed to be so adjusted with relation to the conditions of supply that when a current of high potential is supplied by the feeding circuit, the several translating devices will be operated for whatever purposes may be found desirable. This statement applies to the magnets 7, 8 and 10, as well as to the other translating devices 9 and 11. During the operation of the translating devices currents of a single direction will pass through the receiving circuit returning by way of the vapor converter 5. Should the voltage of the supply circuit momentarily fall below a predetermined amount, the receiving circuit would under ordinary conditions be temporarily deprived of adequate current supply. The tendency of the magnets 7, 8 and 10, however, is to compensate for the momentary drop in the supply circuit by sending energy in the original direction through the receiving mains 3 and 4, by way of the converter 6. The action of the magnet 7 would simply be such as to supply an easy means of self-discharge, while the action of the magnets 8 and 10, would contribute to maintaining energy in the translating devices 9 and 11, respectively, until the supply circuit is again in condition to deliver the requisite voltage for operating the translating devices in the receiving circuit.

Figure 2:
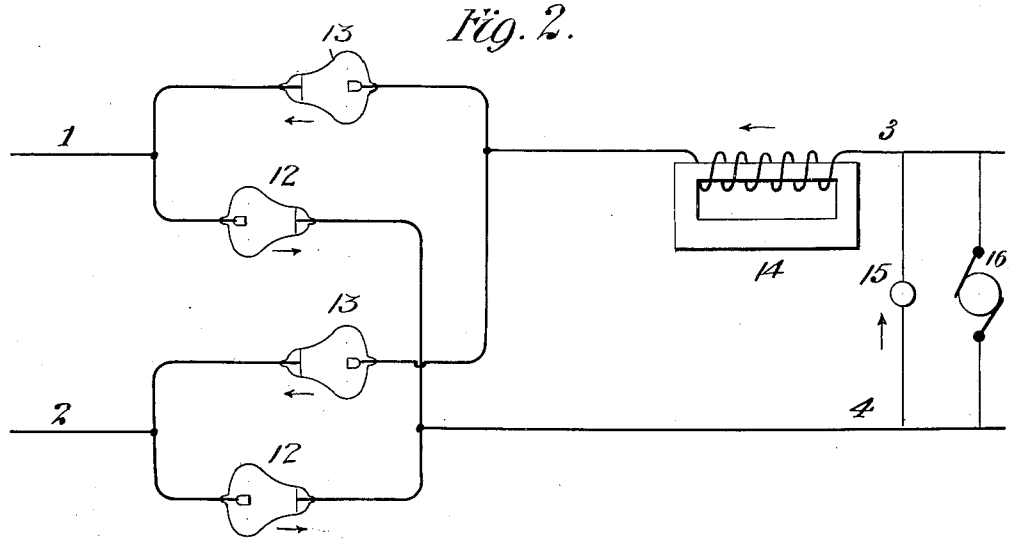

Referring to Fig. 2, the conditions here illustrated are essentially the same as those shown in Fig. 1, except that one of the receiving mains is connected to each supply main through a converter which transmits energy in one direction, and the other receiving main is connected to each supply main through a converter transmitting energy in the opposite direction. These converters may be called positive devices when the direction of flow is from the supply circuit to the receiving circuit, and negative devices when the opposite condition exists. In Fig. 2, positive devices are shown at 12, 12, and negative devices at 13, 13. The magnet which is utilized for steadying the operation in this system is illustrated at 14, and is included in one of the receiving circuit mains, as 3. Obviously this magnet in virtue of its inductance serves to steady the operation of the system by smoothing out and rendering more uniform the flow of the rectified current. Various translating devices appear at 15 and 16. These may be, respectively, a lamp and a motor, or they may be any other suitable translating devices. In this system both phases of the alternating current are utilized, but the flow of current in the receiving circuit is always in the same direction. On a momentary fall of potential in the supply circuit such as would cause a cessation of flow through the converters, the inadequate potential of the supply circuit will be temporarily reinforced by the discharge energy from the magnet 14, thus creating, under the proper conditions, a flow through a short circuit including the several converters and the translating devices in the receiving circuit. In both systems the expenditure of energy in maintaining the flow past a momentary drop of potential is very slight, consisting in utilizing the energy stored up in the magnet coils during the previous operation of the system. In the absence of the converter system illustrated herein, the magnet or magnets would tend to produce the same effect as herein described, but such tendency would be absorbed by the generator without creating such conditions as would steady the operation of the distributing system.

It will be understood that the inductance of the consumption circuit itself, taken in connection with the described arrangement of vapor selectors, may be sufficient to steady the operation of the system without the employment of special magnets for that purpose. It will also be understood that the system herein claimed is intended to cover all the uses to which it is applicable whether for steadying the operation of a distribution system as described or for such other purposes as that.

Figure 3:
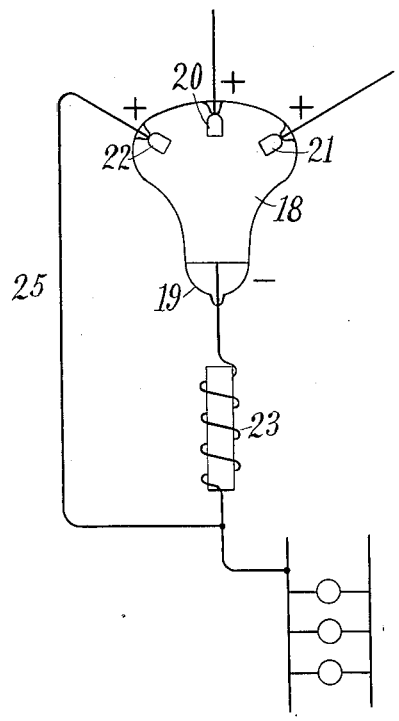

Referring to Fig. 3, the principle of the present invention is here applied to the control of current in a gas or vapor electric apparatus requiring to be supplied with a continuous flow of current in order to keep down the electrode resistance after it has been once overcome. The container of this apparatus is shown at 18, the negative electrode at 19, two positive electrodes at 20 and 21, and a third positive electrode at 22. The electrode 22 is connected by a conductor 25 with the negative electrode 19, through an inductive device 23. The function of the inductance 23 is to maintain current through the gas or vapor electric apparatus in a uniform direction during the periods when the current applied to the electrodes 20 and 21 is not in itself sufficient to prevent the restoration of the resistance at the negative electrode. During the periods when the current from the source is sufficient for the purposes named, the inductance 23 is not required, but when a cessation of current from the source intervenes, the reactive effect of the inductance is such as to impress upon the vapor within the container an electro-motive-force in the right direction for maintaining the normal direction of flow through the apparatus. By virtue of the natural characteristics of gas or vapor electric apparatus of this sort, the electrode 22 cannot become a negative electrode with respect to either of the positive electrodes 20 and 21 until the initial reluctance at the electrode 22 is overcome. Accordingly, there will be no danger of a short circuit through the conductor 25 around the inductance 23 in the natural operation of the device.

Figure 4:
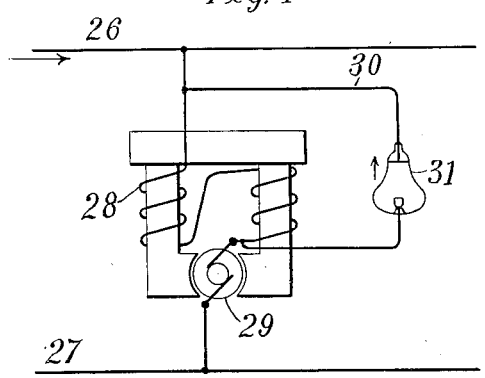

In Fig. 4, I illustrate means for maintaining constant current in the field of an electric motor supplied from any suitable source. The mains extending from the source are shown at 26 and 27, the field coils at 28 and the armature at 29. In a shunt circuit, 30, around the field coils I include a vapor converter, 31, as shown. So long as the current supplied from the mains is constant, the vapor converter plays no part in the action of the motor, owing to the fact that it is so adjusted as not to permit the flow of current in the normal direction of flow through the field. When, however, the electro-motive-force in the supply circuit decreases, the reactive effect produced in the field coils will have a tendency to continue the original direction of the current which will find a path through the vapor converter 31.

Fig. 4 shows my invention as applied to the control of a series motor. The same principle might be applied to other types of electric motors as well.

In a divisional application Serial Number 155,927, filed May 6, 1903, claims are made upon the apparatus described herein.

In a divisional application Serial Number 212,476, filed January 14th, 1904, certain claims are made upon some of the apparatus described herein.

In another divisional application Serial Number 554,401 filed April 9, 1910, claims are made upon certain features of the present invention.

I claim as my invention:—

1. In a system of electrical distribution, the combination with a single phase source and a direct current work circuit, of a plurality of circuits connecting said source to said work circuit, separate means in each of said circuits for rectifying current, including vapor rectifiers having exhausted containers and anodes and cathodes therein, said circuits operating in succession to pass current in the same direction through the work circuit, means for linking together 5 and steadying in the work circuit the current flow from the said plurality of connecting circuits, said means including a serially connected energy storing and restoring device and means for permitting said 10 energy restoring device to discharge through the work circuit and the rectifiers in shunt to the supply circuit.

2. In a system of electrical distribution, the combination with a single phase supply 15 and a direct current work circuit, of two vapor rectifiers each comprising an exhausted container, suitable electrodes therein, one rectifier passing the positive waves of the source to the work circuit the other rectifier passing the negative waves through 20 the work circuit in the same direction and an inductance device in said work circuit, said device provided with a discharge path in shunt to the source whereby the energy stored in the inductance is economically 25 utilized in equalizing and steadying the current flows derived from the two rectifiers.

Signed at New York, in the county of New York, and State of New York, this 3rd day of February, A. D. 1903.

PERCY H. THOMAS.

Witnesses:
WM. H. CAPEL,
GEORGE H. STOCKBRIDGE.